United States Patent [19]

Gilman

[11] 4,303,604

[45] Dec. 1, 1981

[54] METHOD OF MAKING A HIGH RATE CARBON CATHODE

[75] Inventor: Sol Gilman, Rumson, N.J.

[73] Assignee: The United States of America as represented by the Secretary of the Army, Washington, D.C.

[21] Appl. No.: 140,369

[22] Filed: Apr. 14, 1980

[51] Int. Cl.$^3$ .............................................. B29D 9/08
[52] U.S. Cl. .................................... 264/101; 264/87; 264/105; 429/129
[58] Field of Search ...................... 264/87, 105, 101

[56] References Cited

U.S. PATENT DOCUMENTS

| | | | |
|---|---|---|---|
| 3,385,736 | 5/1968 | Deibert | 264/105 |
| 3,389,200 | 6/1968 | Olstowski | 264/105 |
| 3,442,715 | 5/1969 | Yee et al. | 264/105 |
| 3,655,585 | 4/1972 | Dey et al. | 264/105 |

*Primary Examiner*—James H. Derrington
*Attorney, Agent, or Firm*—Nathan Edelberg; Jeremiah G. Murray; Roy E. Gordon

[57] ABSTRACT

A high rate carbon cathode is made by mixing a carbon powder having a surface area of about 1000 square meters/gram with polytetrafluoroethylene and a sufficient amount of water to form a coherent mixture. The mixture is applied to an electrically conductive screen; the cathode formed while wet to an intermediate thickness, the cathode vacuum dried at about 100 degrees C., and the cathode cold compressed to obtain a final electrode porosity of greater than 80 percent. The cathode can be used in a lithium primary cell using a solution of an inorganic lithium salt in sulfuryl chloride as the electrolyte.

5 Claims, No Drawings

METHOD OF MAKING A HIGH RATE CARBON CATHODE

The invention described herein may be manufactured, used, and licensed by or for the Government for governmental purposes without the payment to me of any royalty thereon.

This invention relates to a high rate carbon cathode, to a method of making the cathode, and to an electrochemical cell including the cathode.

The application is copending with U.S. patent application Ser. No. 364,575 filed May 29, 1973 by Behl et al for Anhydrous Inorganic Electrolyte Electrochemical Cell and assigned to a common assignee.

BACKGROUND OF THE INVENTION

A number of oxides and oxyhalides of sulfur, selenium and phosphorus can be utilized as liquid phase cathode reactants in primary lithium battery cells. Such oxides and oxyhalides include sulfur dioxide, phosphorous oxychloride, selenium oxychloride, thionyl chloride and sulfuryl chloride. These compounds can be dissolved in an inert or organic solvent, mixed with each other or used as the sole electrolyte solvent.

One of the most promising of these primary cell systems is the lithium-thionyl chloride cell. One of the most successful cell formulations as disclosed and claimed in U.S. Pat. No. 364,575 uses a solution of lithium aluminum chloride in thionyl chloride as the electrolyte and a Teflon-bonded carbon electrode as the cathode.

It is also disclosed in U.S. Pat. No. 364,575 that the use of sulfuryl chloride as the electrolyte solvent affords the highest open circuit voltage of any known primary cell. The difficulty with the use of sulfuryl chloride is that its closed circuit voltage, capacity, and as a result its energy density is inferior to that of thionyl chloride which has been the most popular of the oxychloride solvents for primary cells.

SUMMARY OF THE INVENTION

The general object of this invention is to provide a high rate electrochemical cell. A more particular object of the invention is to provide such a cell that is characterized by low cathode polarization and increased cathode life and energy density. A particular object of the invention is to provide such a cell that effectively uses sulfuryl chloride as the electrolyte solvent.

It has now been found that the aforementioned objects can be attained by making the cathode for the cell by the steps of:

(A) mixing a carbon powder having a surface area of about 1000 square meters per gram with polytetrafluoroethylene and a sufficient amount of water to form a coherent mixture, (B) applying the mixture to an electrically conductive screen, (C) forming the cathode while wet to an intermediate thickness, (D) vacuum drying the cathode at a temperature of about 100 degrees C., and (E) cold compressing the cathode to obtain a final electrode porosity of greater than 80 percent.

In Step (A), the carbon powder used will preferably have a surface area as determined through gas absorption of about 1000 to 1200 square meters per gram. Such carbon powders include furnace blacks and channel blacks of which a furnace black is preferred. The polytetrafluoroethylene is used in an amount of 7 to 14 percent by weight on a dry basis of the coherent mixture.

In Step (B), the mixture is applied to the electrically conductive screen by conventional techniques. The screen material is preferably resistant to corrosion in sulfuryl chloride. Such a material is pure nickel or a high nickel steel. Moreover, it is preferred that the screen be characterized by a maximum tortuosity for good anchoring of the polytetrafluoroethylene-carbon mixture and to provide high electronic conduction.

In Step (C), the cathode is compressed while still moist to an intermediate thickness greater than the final electrode thickness.

In Step (D), drying is preferably carried out under vacuum or in the presence of an inert gas to prevent oxidation of the screen. The dry cathode polytetrafluoroethylene-carbon mix is now highly cracked and poorly adherent to the screen.

In Step (E), the cathode is cold compressed to a value less than the final thickness in a suitable frame. The natural resiliency of the cathode causes it to re-expand to the final thickness when pressure is released. The cold-compression step is found to "heal" the cracks in the polytetrafluoroethylene-carbon mixture leaving micro-tunnels which contribute to the very high porosity of greater than 80 percent of the final structure. That porosity is responsible for the high capacity of the electrode. The high surface area of the carbon is responsible for the high closed circuit voltages obtained. Previously reported inferior results in U.S. Pat. No. 364,575 for sulfuryl chloride vis-a-vis thionyl chloride, were due to the necessity for using low-area carbon black which does not require the processing described above. Cathodes using low area carbon, as for example, acetylene black having a gas adsorption area of 60 meter$^2$/gram are adequate for use with thionyl chloride, but serve poorly for sulfuryl chloride.

DESCRIPTION OF THE PREFERRED EMBODIMENT

A cathode according to the invention is made in the following manner.

One gram of a furnace black carbon powder having a surface area of about 1000 square meters per gram is mixed with an emulsion containing 0.12 grams of polytetrafluoroethylene and a sufficient amount of water to yield a stiff paste. The paste is then applied to a 2.5 cm × 2 cm expanded nickel support screen. The support is prepared by welding 2 thicknesses of screen together, with the mesh out of registration so as to provide maximum tortuosity. While still moist, the electrode is compressed to an intermediate thickness of 0.0615 inch. After vacuum drying for 24 hours at 99 degrees C., the cathode is compressed in a 0.025 inch frame and after re-expansion has a final thickness of 0.035 inch. The cathode has a porosity of 87 percent.

A complete cell can be conveniently assembled in an all-Teflon jig with the plane of the electrodes parallel to the bottom of the jig. The cathode as prepared above is placed between two lithium anodes. A lithium foil electrode placed in the same plane as the cathode serves as a reference. A 0.012 inch thick glass "filter paper" provides mechanical separation between the cathode and the lithium counter-electrodes, facing it on each side. The lithium anodes are fabricated by pressing nickel Exmet into a 0.050 inch thick lithium foil. After assembling the cell and adding 3 cc of a 1.5 molar solution of lithium aluminum chloride in sulfuryl chloride as the electrolyte, a Teflon weight is applied to the cell to help maintain good contact between the cell components.

The improvement in closed circuit voltage over a wide range of current densities is upwards of 0.3 volt when compared to the same cell using thionyl chloride as the electrolyte solvent and Shawinigan black in the cathode as can be seen by referring to the TABLE. Reference to the TABLE also indicate that further improvement in cell voltage is obtained when the electrolyte is pre-saturated with chlorine. The improvement in cell capacity for $SO_2Cl_2$ as compared with $SOCl_2$ is upwards of 10% for cells with or without $Cl_2$ pre-saturation.

TABLE

| Current Density $mA/cm^2$ (based on lxw, one side) | $Li/SOCl_2$ Cell Voltage | $Li/SO_2Cl_2$ Cell Voltage | $Li/(SO_2Cl_2 + Cl_2)$ Cell Voltage |
| --- | --- | --- | --- |
| 0.1 | 3.67 | 3.91 | 3.93 |
| 0.2 | 3.59 | 3.89 | 3.91 |
| 0.5 | 3.56 | 3.87 | 3.89 |
| 1.0 | 3.51 | 3.86 | 3.87 |
| 2.0 | 3.50 | 3.83 | 3.84 |
| 5.0 | 3.45 | 3.79 | |
| 10.0 | 3.31 | 3.67 | |
| 20.0 | 3.14 | 3.31 | |

In lieu of pre-saturation with chlorine, one may add other halogens and/or interhalogens to the electrolyte. For example, the invention contemplates the addition of fluorine, iodine trichloride, combinations of chlorine and iodine trichloride, etc.

One may also modify the electrolyte by adding various inorganic solvents such as thionyl chloride and phosphorous oxychloride and such organic solvents as propylene carbonate, acetonitrile, etc. These solvents are added to modify the physiochemical properties of the electrolyte such as the conductivity, boiling point, freezing point, vapor pressure, etc.

In lieu of lithium as the anode, one may use other active metals such as magnesium, calcium, and alloys of lithium, magnesium and calcium with each other and with other metals. When one substitutes another active metal for lithium, one may find it advantageous to use the corresponding cationic metallic ion in the electrolyte.

I wish it to be understood that I do not desire to be limited to the exact details as described for obvious modifications will occur to a person skilled in the art.

What is claimed is:

1. Method of making a high rate carbon cathode for use in lithium-sulfuryl chloride battery cells, said method including the steps of:
    (A) mixing a carbon powder having a surface area of about 1000 square meters/gram with polytetrafluoroethylene and a sufficient amount of water to form a coherent mixture;
    (B) applying the mixture to an electrically conductive screen,
    (C) forming the cathode while wet to an intermediate thickness;
    (D) vacuum drying the cathode at a temperature of about 100 degrees C.; and
    (E) cold compressing the cathode to obtain a final electrode porosity of greater than 80 percent.

2. Method according to claim 1 wherein in Step (A) the polytetrafluoroethylene is about 7 to 14 weight percent on a dry basis of the coherent mixture.

3. Method according to claim 1 wherein the electrically conductive screen is resistant to corrosion in sulfuryl chloride.

4. Method according to claim 3 wherein the electrically conductive screen is a nickel screen having a high tortuosity for good anchoring of the polytetrafluoroethylene-carbon mixture.

5. Method of making a high rate carbon cathode for use in lithium sulfuryl chloride battery cells, said method including the steps of:
    (A) mixing a carbon powder having a surface area of about 1000 square meters/gram with polytetrafluoroethylene and a sufficient amount of water to form a coherent mixture, the polytetrafluoroethylene being about 7 to 14 weight percent on a dry basis of the coherent mixture,
    (B) applying the mixture to a nickel screen having a high tortuosity for good anchoring of the polytetrafluoroethylene carbon mixture,
    (C) forming the cathode while wet to an intermediate thickness,
    (D) vacuum drying the cathode at a temperature of about 100 degrees C., and
    (E) cold compressing the cathode to obtain a final electrode porosity of greater than 80 percent.

* * * * *